(12) United States Patent
Jin

(10) Patent No.: US 7,778,616 B2
(45) Date of Patent: Aug. 17, 2010

(54) METHOD AND APPARATUS FOR REDUCING SIGNAL INTERFERENCE IN A WIRELESS RECEIVER BASED ON SIGNAL-TO-INTERFERENCE RATIO

(75) Inventor: Xin Jin, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 532 days.

(21) Appl. No.: 11/861,088

(22) Filed: Sep. 25, 2007

(65) Prior Publication Data
US 2008/0009254 A1    Jan. 10, 2008

Related U.S. Application Data

(62) Division of application No. 10/883,246, filed on Jun. 30, 2004, now Pat. No. 7,274,920.

(51) Int. Cl.
*H04B 1/06* (2006.01)
(52) U.S. Cl. .................. 455/234.1; 455/63; 455/296; 455/336.1
(58) Field of Classification Search ............. 455/234.1
See application file for complete search history.

(56) References Cited
U.S. PATENT DOCUMENTS
6,208,849 B1 * 3/2001 Cho et al. .................. 455/296

FOREIGN PATENT DOCUMENTS
EP    0814567 A2    12/1997
EP    1298806 A1    4/2003
EP    1326347 A3    7/2003

OTHER PUBLICATIONS

European Search Report Application # 04253937.9 dated Dec. 16, 2004.

* cited by examiner

*Primary Examiner*—Duc Nguyen
*Assistant Examiner*—Ajibola Akinyemi
(74) *Attorney, Agent, or Firm*—John J. Oskorep, Esq.

(57) ABSTRACT

One illustrative method of reducing signal interference in a wireless receiver includes receiving a radio frequency (RF) signal; amplifying the received RF signal with a gain G; producing a baseband signal from the amplified RF signal; producing a signal-to-interference (S/I) ratio from the baseband signal; and adjusting the gain G based on the S/I ratio. Preferably, the gain G is varied over a time period to produce a plurality of S/I ratios, so that the gain G corresponding a maximum S/I ratio produced over the time period can be selected for optimal performance. With this technique, higher accuracy is provided as intermodulation distortion is accounted for in the S/I ratio. Advantageously, the S/I ratio calculations and the gain adjustments are performed digitally by one or more processors such as a digital signal processor (DSP).

20 Claims, 6 Drawing Sheets

FIG. 1
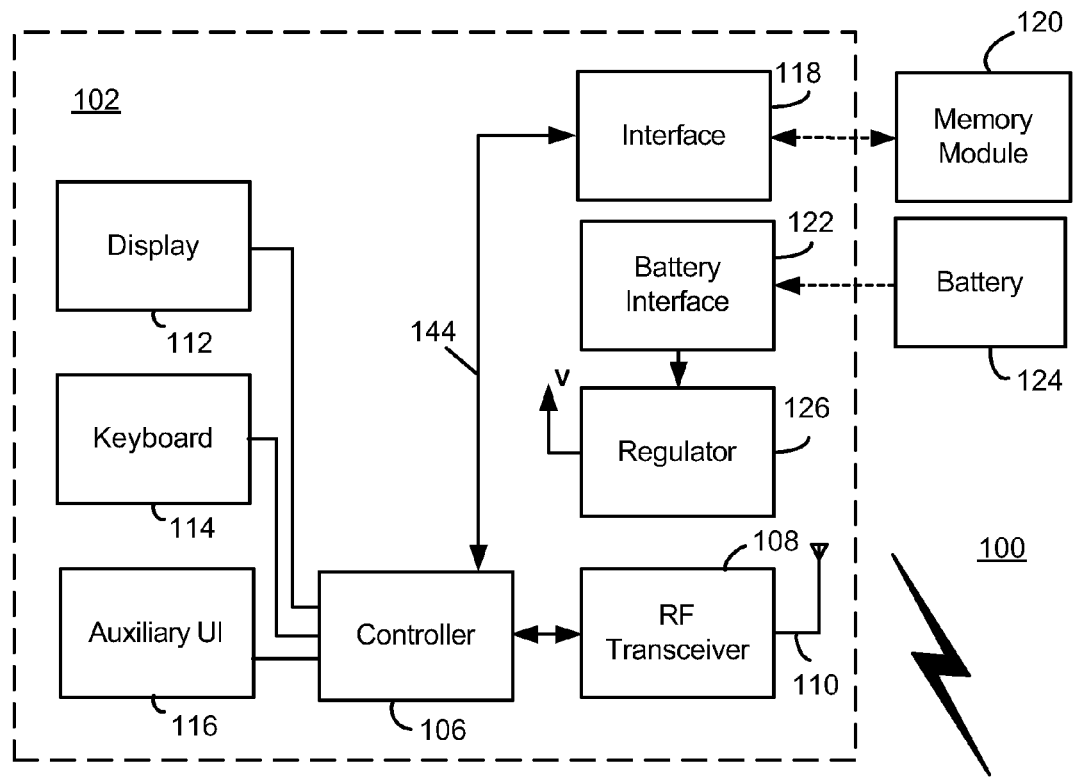
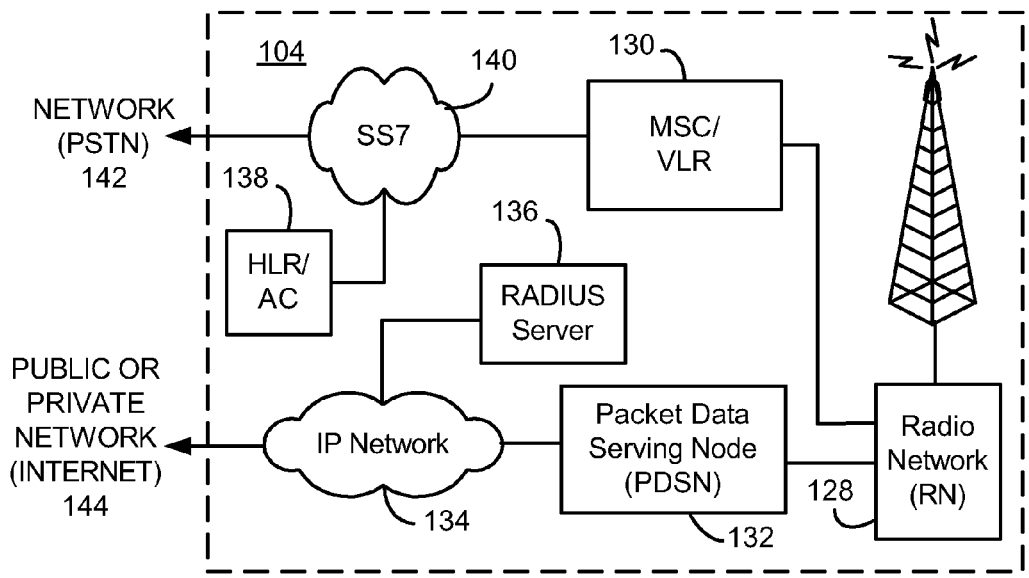

-- PRIOR ART --

METHOD AND APPARATUS FOR REDUCING SIGNAL INTERFERENCE IN A WIRELESS RECEIVER BASED ON SIGNAL-TO-INTERFERENCE RATIO

CROSS-REFERENCE TO RELATED APPLICATION

This application is a divisional of and claims priority to a U.S. non-provisional patent application of the same title and having application Ser. No. 10/883,246 and filing date of 30 Jun. 2004.

BACKGROUND

1. Field of the Invention

The present invention relates generally to mobile stations operating in wireless communication networks, and more particularly to methods and apparatus for reducing signal interference in a wireless receiver having a low noise amplifier (LNA) with use of a detected signal-to-interference (S/I) ratio.

2. Description of the Related Art

A wireless communication device, such as a mobile station operating in a wireless communication network, may provide for both voice telephony and packet data communications. A mobile station may, for example, be compatible with $3^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

All of these communication standards utilize radio frequency (RF) signal detection techniques. In an RF receiver, internal thermal noise is sometimes the predominate source of interference to the desired signal. In this case, a lower noise figure of the receiver is appropriate and will lead to improved receiver sensitivity. At other times, external in-band interference (including external in-band noise) is the major source of interference as the out-of-band portion of the interference is insignificant to cause distortion. This in case, a higher in-band dynamic range of the receiver is appropriate and required for good performance. The in-band dynamic range of the receiver is usually measured by the in-band $3^{rd}$ order interception point (i.e. "in-band IP3"). At other times, the out-of-band interference is the primary source of interference, producing distortions in the in-band spectrum through non-linearity of the receiver. In this case, a higher out-of-band dynamic range of the receiver is needed to improve performance. The out-of-band dynamic range is usually measured by the out-of-band $3^{rd}$ order interception point (i.e. "out-of-band IP3").

The higher dynamic range requirements described above are often in conflict with the lower noise figure requirement. The former prefers a lower front end gain, while the latter needs a higher front end gain. A front end that is designed to be good for both scenarios would be expensive in cost. For a lower cost solution, some receiver designs include a variable front end stage. In particular, a low noise amplifier (LNA) of the front end may have an adjustable gain G which is controlled by a feedback mechanism. In general, the gain G of the LNA is adjusted dynamically in response to the feedback mechanism in order to trade off the noise figure with the dynamic range of the LNA when necessary. The feedback mechanism includes a level detector having an input signal which may be provided from one of a few different sources. Where the input signal is taken from analog sources of the receiver, the level detector can advantageously detect both in-band and out-of-band contents of the signal/interference/distortion. However, the disadvantage is one of relatively higher cost and lower accuracy inherent in today's analog signal processing. When the level detector is part of a digital signal processor (DSP), the advantage is one of relatively lower cost and higher accuracy inherent in today's digital signal processing. However, the disadvantage is that the level detector within the DSP can only sense in-band contents of the signal/interference/distortion.

Accordingly, what are needed are methods and apparatus for reducing signal interference in a wireless receiver so as to overcome the deficiencies in the prior art.

BRIEF DESCRIPTION OF THE DRAWINGS

Embodiments of present invention will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
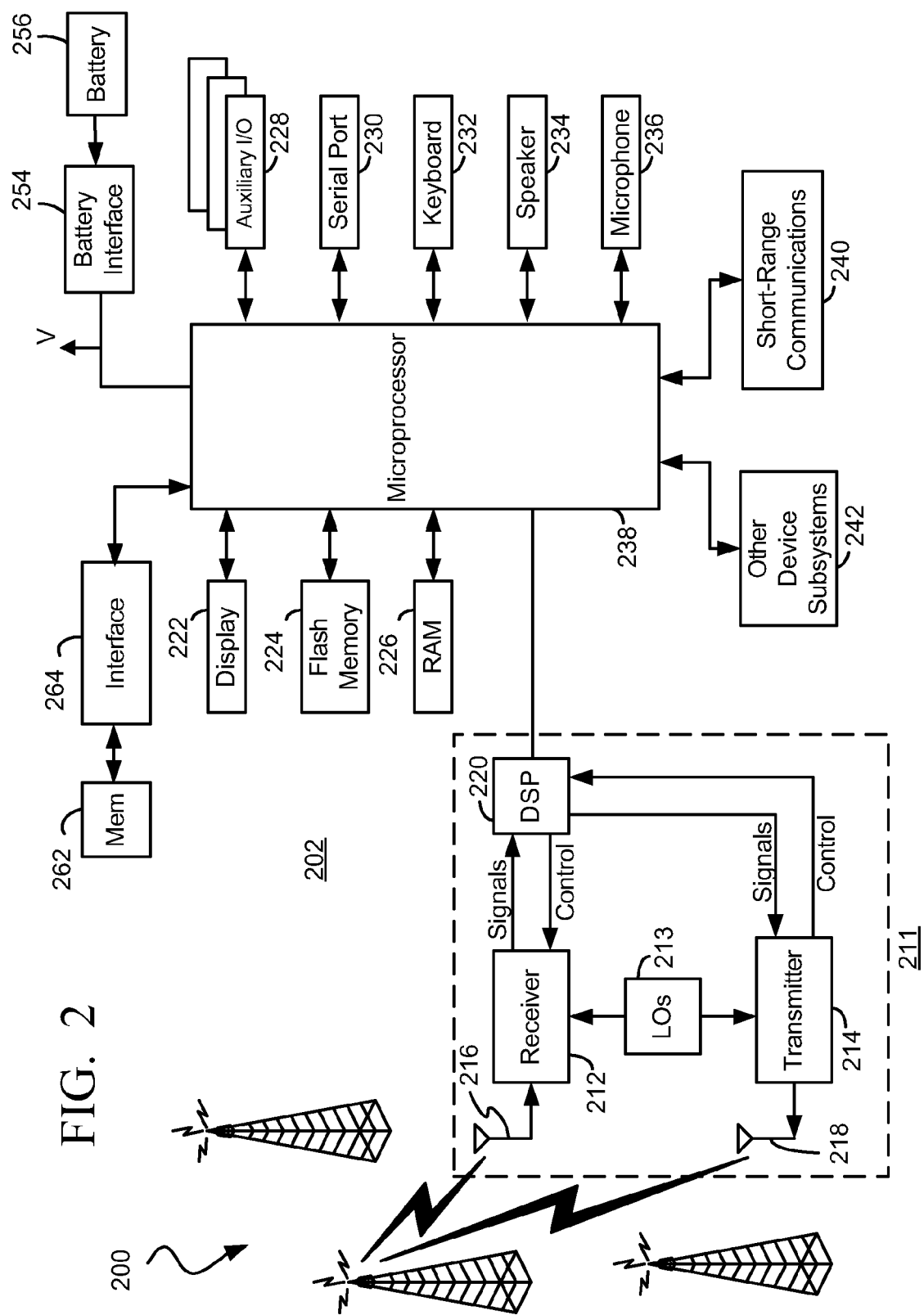
FIG. 2 is a more detailed diagram of a preferred mobile station of FIG. 1.

One illustrative method of reducing signal interference in a wireless receiver includes receiving a radio frequency (RF) signal; amplifying the received RF signal with a gain G; producing a baseband signal from the amplified RF signal; producing a signal-to-interference (S/I) ratio from the baseband signal; and adjusting the gain G based on the S/I ratio. Preferably, the gain G is varied over a time period to produce a plurality of S/I ratios, so that the gain G corresponding a maximum S/I ratio produced over the time period can be selected for optimal performance. With this technique, higher accuracy is provided as intermodulation distortion is accounted for in the S/I ratio. The S/I ratio calculations and the gain adjustments are performed digitally by one or more processors such as a digital signal processor (DSP).

FIG. 1 is a block diagram of a communication system 100, which includes a mobile station 102, which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Typically, controller 106 is embodied as a central processing unit (CPU), which runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device, providing an output having a regulated voltage V. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a cdma2000™ network which includes fixed network components coupled as shown in FIG. 1. Cdma2000™ is a trademark of the Telecommunications Industry Association (TIA). Wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. HLR/AC 138 also authenticates mobile station 102 on system access.

In order to provide packet data services to mobile station 102 in a cdma2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 utilized in the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown) which regulates power to all of the circuitry, providing an output having a regulated voltage V.

Microprocessor 238, which is one implementation of controller 106 of FIG. 1, controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications, which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component, which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
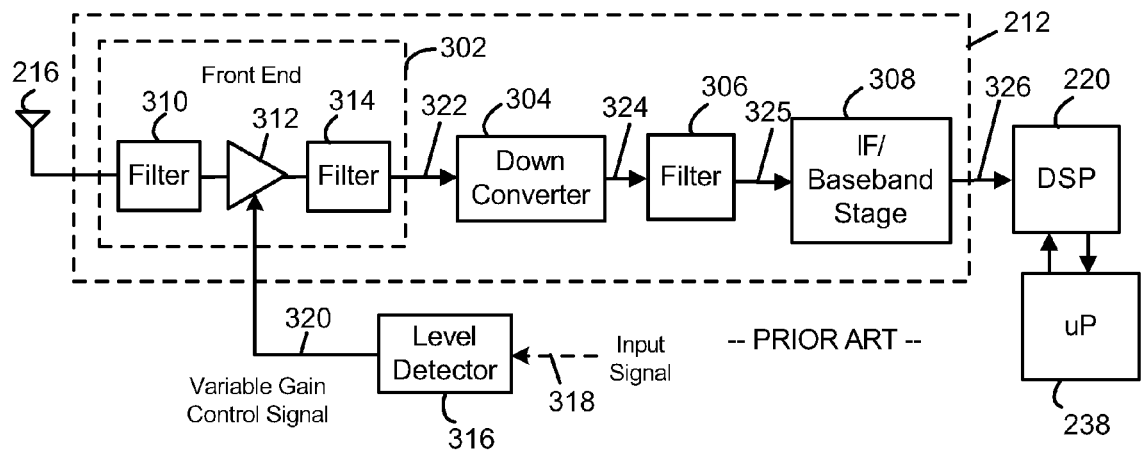
FIG. 3 is a schematic block diagram of conventional components for reducing noise in the mobile station.

FIG. 3 is a schematic block diagram of receiver 212 of the prior art. Receiver 212 of FIG. 3 includes a front end stage 302, a down converter 304, a filter 306, and an intermediate frequency (IF) and/or baseband stage 308. Front end stage 302 typically includes a filter 310, a low noise amplifier (LNA) 312, and a filter 314. Filter 310 of front end stage 302 has an input coupled to antenna 216 and an output coupled to an input of LNA 312. LNA 312 has an output coupled to an input of filter 314, which has an output 322 coupled to an input of down converter 304. Down converter 304 has an output 324 coupled to an input of filter 306. An output 325 of filter 306 is coupled to an input of IF/baseband stage 308, which has an output 326 coupled to DSP 220.

In front end stage 302, filters 310 and 314 are bandpass filters typically using Surface Acoustic Wave (SAW) filter technology. The function of down converter 304 is to mix the RF signals received through front end stage 302 with a local oscillator (LO) in down converter 304, to thereby produce IF signals (or baseband signals if zero IF technology is utilized). The function of IF/baseband stage 308 is to convert the IF signals into baseband signals (unless zero IF technology is utilized) and to process and/or filter the baseband signals. Filter 306 may be part of IF/baseband 308. When IF is used, filter 306 is typically a bandpass filter; when zero IF is used, filter 306 is typically a low pass filter. When IF is used, it is possible that filter 306 is implemented in multiple stages; for example, a bandpass filter in the IF stage and a lowpass filter at the baseband stage. DSP 220 operates to process the baseband signals, for example, to correlate the baseband signals with a predetermined signal under control of microprocessor 238.

Figure 4:
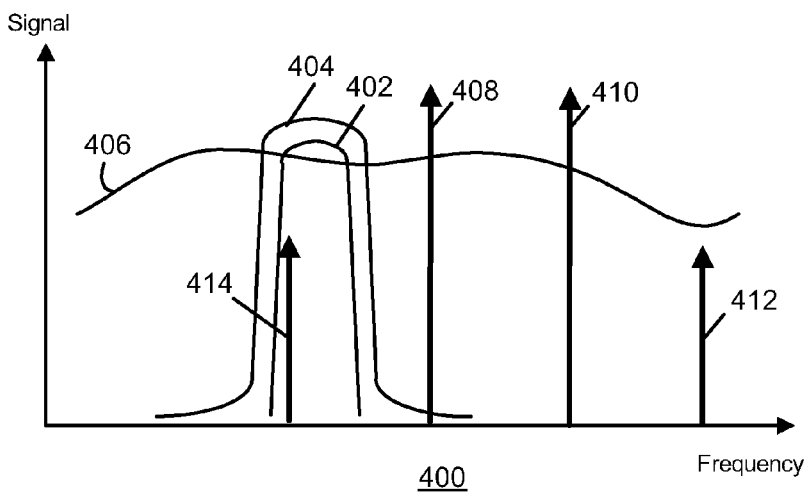
FIG. 4 is a graph of signals in a frequency domain before noise reduction by filtering of the prior art.
Figure 5:
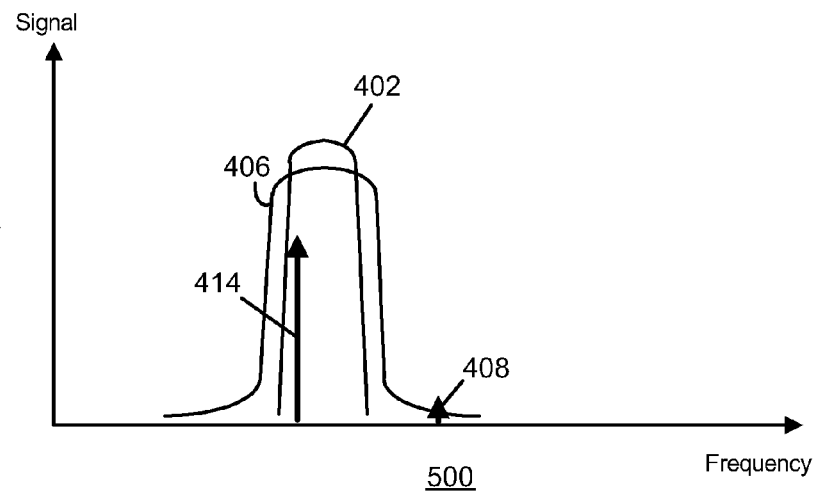
FIG. 5 is a graph of signals in the frequency domain after noise reduction by filtering of the prior art.

FIG. 4 is a graph 400 showing curves in the frequency domain at output 322 and/or output 324 in receiver 212 (although outputs 322 and 324 are associated with different frequency ranges). In graph 400, a curve 402 depicts the desired received signal, a curve 406 depicts internal noise as well as external interference, curves 408 and 410 depict strong narrow out-of-band interference, and curves 412 and 414 depict intermodulation distortion produced in front end stage 302 due to undesirable non-linearity. A curve 404 depicts the shape of a response of filter 306 that follows, which is intended to remove the out-of-band interference and distortion. FIG. 5 is a graph 500 of curves in the frequency domain at output 325 and/or output 326 in receiver 212 (although outputs 325 and 326 may be associated with different frequency ranges). Note that curve 406 of FIG. 5 depicting the internal noise and external interference after filtering becomes shaped similarly to filter's 306 response (i.e. curve 404 of FIG. 4). As illustrated, the out-of-band contents (by comparing curve 406 of FIG. 4) are greatly reduced. Out-of-band interferences and intermodulation distortion (i.e. curves 408 and 410 as well as 412 of FIG. 4) are also greatly reduced. Intermodulation distortion (i.e. curve 414) may still exist.

In order to improve processing due to the trade-off in noise figure and dynamic range requirements, some receiver designs include a variable front end stage. In particular, referring back to FIG. 3, LNA 312 has an adjustable gain G which is controlled by a variable gain control signal 320 from a feedback mechanism. In general, the gain G of LNA 312 is adjusted dynamically in response to the feedback mechanism in order to trade off the noise figure with the dynamic range of LNA 312 when necessary. LNA 312 has an inherent limited dynamic range due to its imperfect non-linearity.

In the prior art, the feedback mechanism for LNA 312 is based on a level detector 316. In general, variable gain control signal 320 is produced based on an output of level detector 316 which is input to LNA 312 for controlling the gain G. Level detector 316 operates to detect an overall level or amplitude of an input signal 318 which is the total desired signal plus interference and distortion. During steady state operation, level detector 316 continually monitors the total desired signal plus interference and distortion. When the signal level is high, for example, level detector 316 causes variable gain control signal 320 to reduce the adjustable gain G to LNA 312. The reason is that, in this situation, receiver 212 requires a higher dynamic range since the noise figure is less important.

Level detector 316 receives input signal 318 from one of a few different sources, depending on which prior art technique is utilized. One source is from output 322 of front end stage 302, another source is from output 324 of down converter 304, and yet another source is from output 326 where level detector 316 is included in the signal processing of DSP 220. When input signal 318 is taken from output 322 of front end stage 302 or from output 324 of down converter 304, then level detector 316 can advantageously detect both in-band and out-of-band contents of the signal/interference/distortion. However, the disadvantage is one of relatively higher cost and lower accuracy inherent in today's analog signal processing. When input signal 318 is taken from output 326 where level detector 316 is included in DSP 220, the advantage is one of relatively lower cost and higher accuracy inherent in today's digital signal processing. However, the disadvantage is that level detector 316 within DSP 220 can only sense in-band contents of the signal/interference/distortion.

Figure 6:
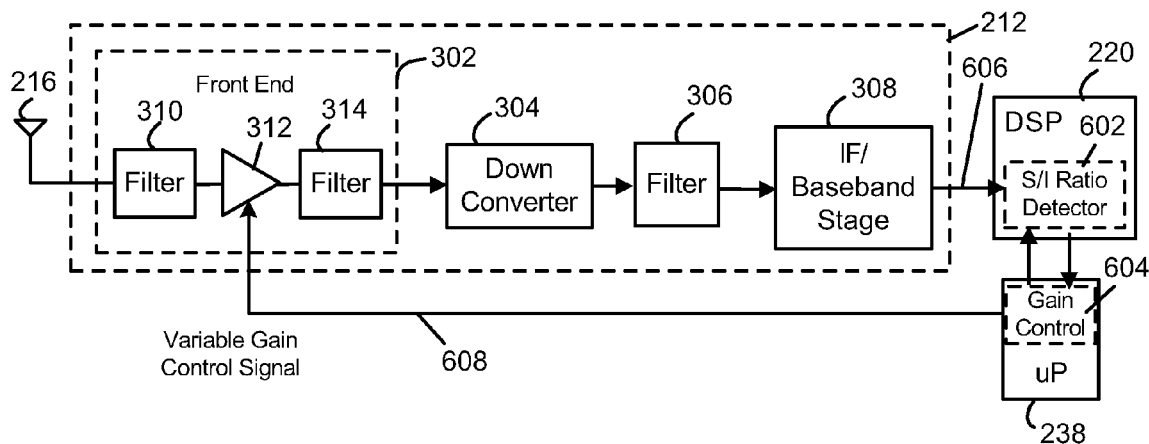
FIG. 6 is a schematic block diagram of pertinent components in the methods and apparatus for reducing signal interference in a wireless receiver based on signal-to-interference (S/I) ratio.

FIG. 6 is a schematic block diagram of pertinent components in the methods and apparatus of the present application. The components described are for use in reducing signal interference in a wireless receiver based on signal-to-interference (S/I) ratio. As shown in FIG. 6, several components are the same as those shown and described in relation to FIG. 3 where the reference numerals depict like components. In FIG. 6, however, the feedback mechanism in the receiver includes a signal-to-interference (S/I) ratio detector 602 in DSP 220 and a gain control mechanism 604 in microprocessor 238. DSP 220 may be referred to as a baseband signal processor. Since such processing is included within one or more processors, computer instructions stored in memory are utilized to execute the techniques of the present application. Note that, although gain control mechanism 604 is shown as being included in microprocessor 238, it may be alternatively incorporated within the processing of DSP 220.

As shown in FIG. 6, S/I ratio detector 602 of DSP 220 has an input 606 coupled to an output 606 of IF/baseband stage 308, an output coupled to gain control mechanism 604, and a control input coupled to a control output of gain control mechanism 604. S/I ratio detector 602 is operative to detect a S/I ratio of incoming baseband signals from the receiver. Note that S/I ratio detector 602 includes a signal-to-noise (S/N) detecting capability but also takes distortion into account (as interference=noise+external interference+distortion). In general, S/I ratio detector 602 is operative to detect the desired signal (S), receive the interference signal (I), calculate the signal powers of S and I, and divide the signal power of S by the signal power of I. In the present embodiment, S/I ratio detector 602 utilizes the total incoming signal from IF/baseband stage 308 (which includes the desired signal, noise, distortion, interference) as the interference signal (I) since the desired signal is relatively negligible in comparison in a high processing gain CDMA system. For signals not based on CDMA or DSSS (Direct Sequence Spread Spectrum), there are other ways to detect the S/I ratio. For M-ary QAM signals, for example, the processor may utilize the power of the constellation mean value as the signal power estimate and the power of the decision feedback error signal (i.e. the signal subtracted by its decision) as interference power estimate. Those skilled in the art are familiar with such techniques.

Gain control mechanism 604 has an output 608 which produces a variable gain control signal to LNA 312. In general, the variable gain control signal is selected based on the S/I ratio detection. In particular, the variable gain control signal is primarily selected in accordance with the optimal or maximum S/I ratio during a "normal receiving mode" of operation. In a "gain determination mode", however, gain control mechanism 604 operates to select test gain values to produce corresponding S/I ratio values so that a "fresh" or "updated" optimal S/I ratio and corresponding optimal gain value can be identified. Preferably, the test gain values are selected within a predetermined range of the last or current know optimal gain values (e.g. several values plus and minus the current optimal gain value). Thus, gain control mechanism 604 includes processing to vary the gain to LNA 312 over a time period to produce a plurality of S/I ratios from S/I ratio detector 602 and subsequently select the gain associated with a maximum S/I ratio produced over the time period. Gain control mechanism 604 sets output 608 to LNA 312 with the optimal gain value during the normal receiving mode of operation.

The above-described technique may be performed continuously such that the gain corresponding to the optimal or maximum S/I ratio is continuously identified and utilized during the normal receiving mode of operation. Alternatively, the technique may be performed during regular, periodic intervals (or alternatively irregular spontaneous intervals) when there is availability to do so. Note that there may be as little as only two gain settings, but preferably there are a large number of gain settings to provide for a refined quality signal. The step size from one gain setting to the next is preferably sufficiently small so that the received signal is not significantly worsened when a new test gain value is utilized, while being sufficiently large so that a difference in the corresponding S/I ratio can be distinguished.

Advantageously, the receiver and gain control mechanism of the present application have desirable characteristics of sensing both in-band and out-of-band (through distortion) contents with a relatively lower cost and higher accuracy inherent with today's signal processing.

Figure 8:
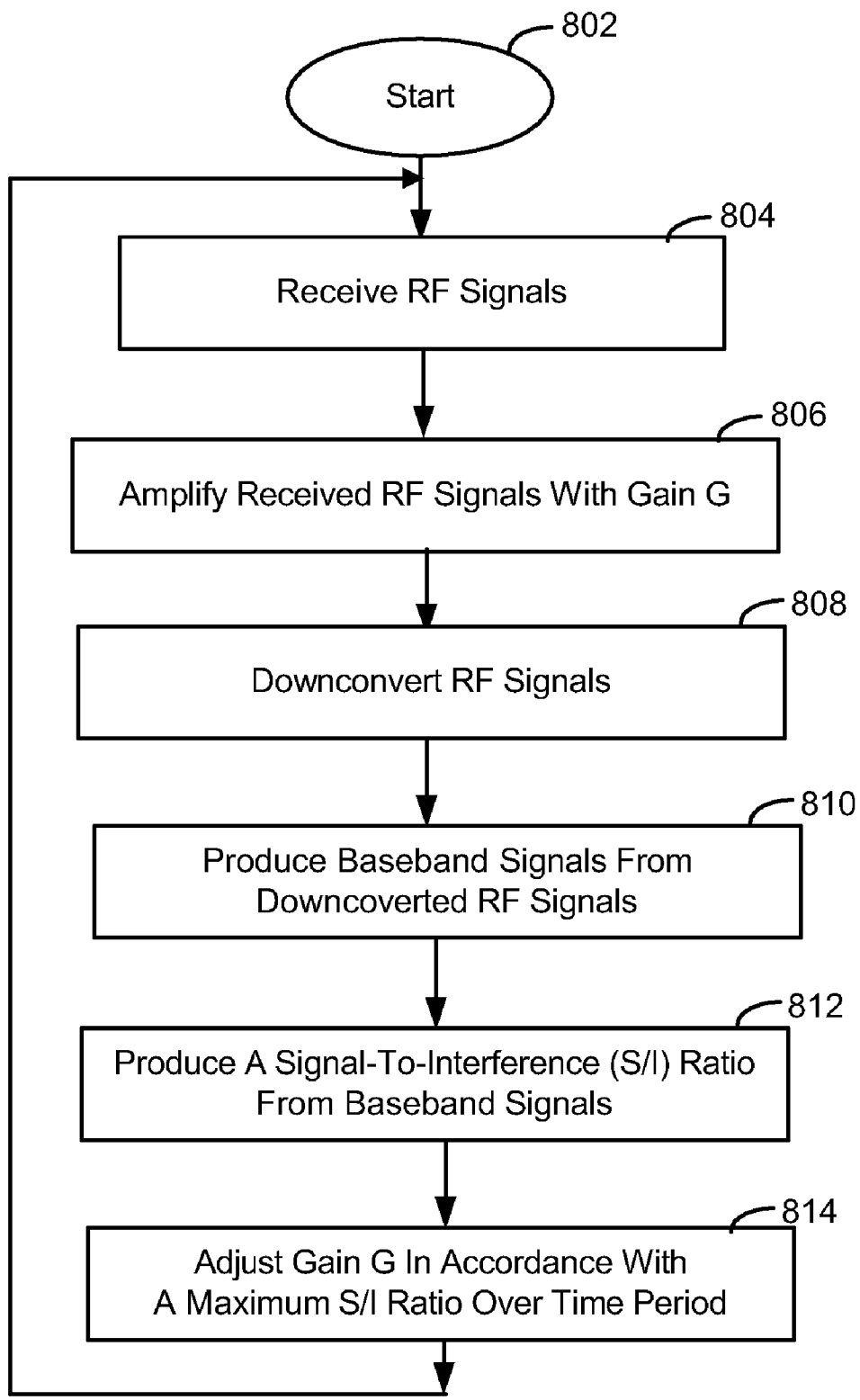
FIG. 8 is a flowchart for use in describing the method of reducing signal interference in the wireless receiver based on the signal-to-interference (S/I) ratio.

FIG. 8 is a flowchart for use in describing the method of reducing signal interference in the wireless receiver based on the signal-to-interference (S/I) ratio, within the context described above in relation to FIG. 6. A computer program product may include a storage medium (e.g. memory or a computer disk) and computer instructions stored therein for executing the steps described in the flowchart and elsewhere in the present application. Beginning at a start block 802 of FIG. 8, radio frequency (RF) signals are received in a wireless receiver (step 804 of FIG. 8). The RF signals are amplified by an amplifier according to a gain G which is selected and set by a gain control mechanism (step 806 of FIG. 8). The amplified RF signals are then downconverted (step 808 of FIG. 8). Next, baseband signals are produced from the downconverted signals (step 810 of FIG. 8). An S/I detector then produces an S/I ratio from the baseband signals (step 812 of FIG. 8). This is performed over a period of time such that a plurality of S/I ratio values corresponding to a plurality of gain values are identified. Next, the gain control mechanism adjusts the gain G in accordance with an optimal or maximum S/I ratio identified over the period of time (step 814 of FIG. 8). The method may repeat continuously as shown in the flowchart.

Figure 7:
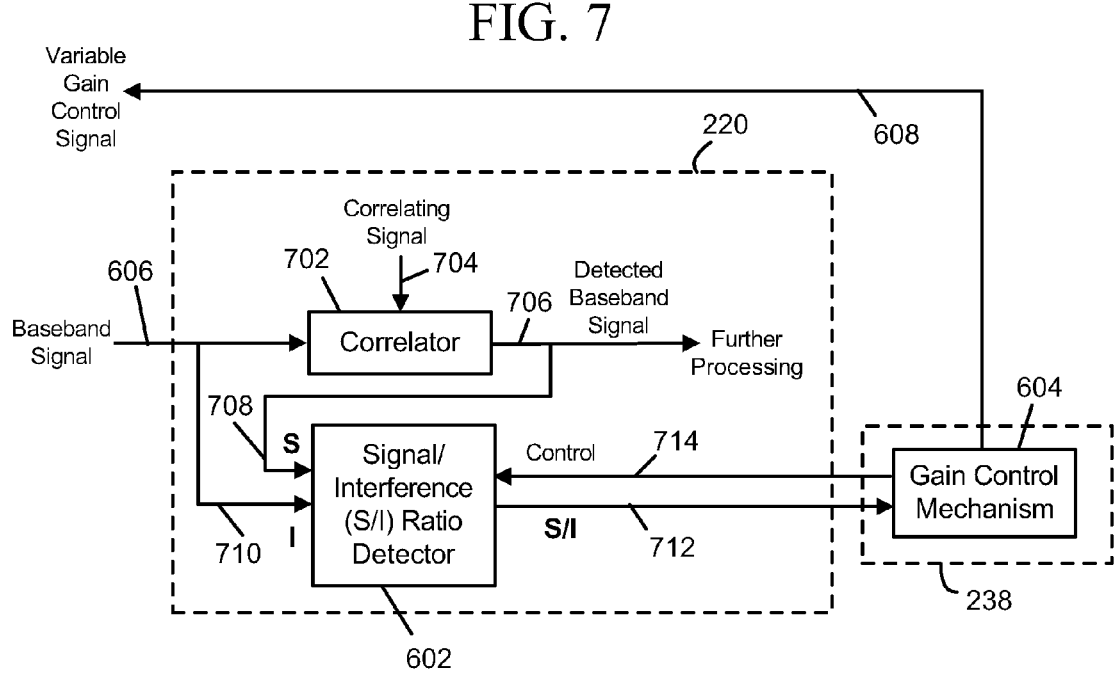
FIG. 7 is one example of processing which may be utilized in the diagram of FIG. 6 for detecting the signal-to-interference (S/I) ratio.

A specific implementation of the S/I detector and feedback mechanism within a CDMA environment is now shown and described in relation to FIG. 7. In FIG. 7, DSP 220 includes a signal correlator 702 having input 606 (i.e. to receive baseband signals), an input 704 to receive a predetermined correlating signal, and an output 706 which produces a detected baseband signal. Note that input 606 may be coupled directly to an output of an automatic gain control (AGC) stage within IF/baseband stage 308 (FIG. 6). The predetermined correlating signal at input 704 is used to correlate with a desired signal within the baseband signals at input 606 to produce the detected baseband signal at output 706, which is processed further by DSP 220 as is conventional.

S/I ratio detector 602 of FIG. 7 includes a first input 708 which is also coupled to output 706 of signal correlator 702 to receive this detected signal (S), a second input 710 coupled to input 606 to receive the total signal (which is an approximation of the interference signal (I)), and an output 712 which produces the S/I ratio value. S/I ratio detector 602 operates to calculate the signal power of S at input 708, calculate the signal power of I at input 710, divide the signal power of S by the signal power of I with use of a divider, and provide the resulting S/I ratio value at output 712 to the gain control mechanism 604. Gain control mechanism 604 operates as described above in relation to FIGS. 6-7 and as further described herein. Gain control mechanism 604 may require control of S/I ratio detector 602 at an input 714, especially where DSP 220 includes the memory which stores the values of gain-to-S/I ratio values. Thus, the method used in the configuration of FIG. 7 may include the steps of determining a baseband signal power based on the baseband signal; correlating the baseband signal with a predetermined correlation signal to produce a detected baseband signal; determining a detected baseband signal power based on the detected baseband signal; and dividing the detected baseband signal power by the baseband signal power to produce the signal-to-interference ratio.

Note that when an AGC is utilized in the earlier processing stages (e.g. in IF/Baseband stage 308), the total power at input 606 is maintained at a constant level. This means that the approximation to the interference power is already normalized. In such cases, S/I ratio detector 602 does not need a divider, second input 710, etc. The processing in S/I ratio detector 602 includes calculating the power at input 708 and scaling.

As described earlier above, the feedback mechanism may operate in a normal receiving mode of operation and a gain determination mode of operation. During the gain determination mode of operation, however, there may be a concern that test gain values will adversely affect the condition of signals currently being received and processed in the receiver. These concerns may be alleviated by employing one or more of several different techniques. One technique requires that the mobile station have at least some control over the received signal power from the base station, such as through power control as defined in IS-2000. In this case, the mobile station adjusts the signal power to be increased when test gain values are being utilized. The increase may be any suitable predetermined increase in the original signal power that is otherwise specified or calculated. This way, any otherwise less acceptable reception during the test period due to use of a non-optimal gain value will be negated by the increased signal power.

Figure 9:
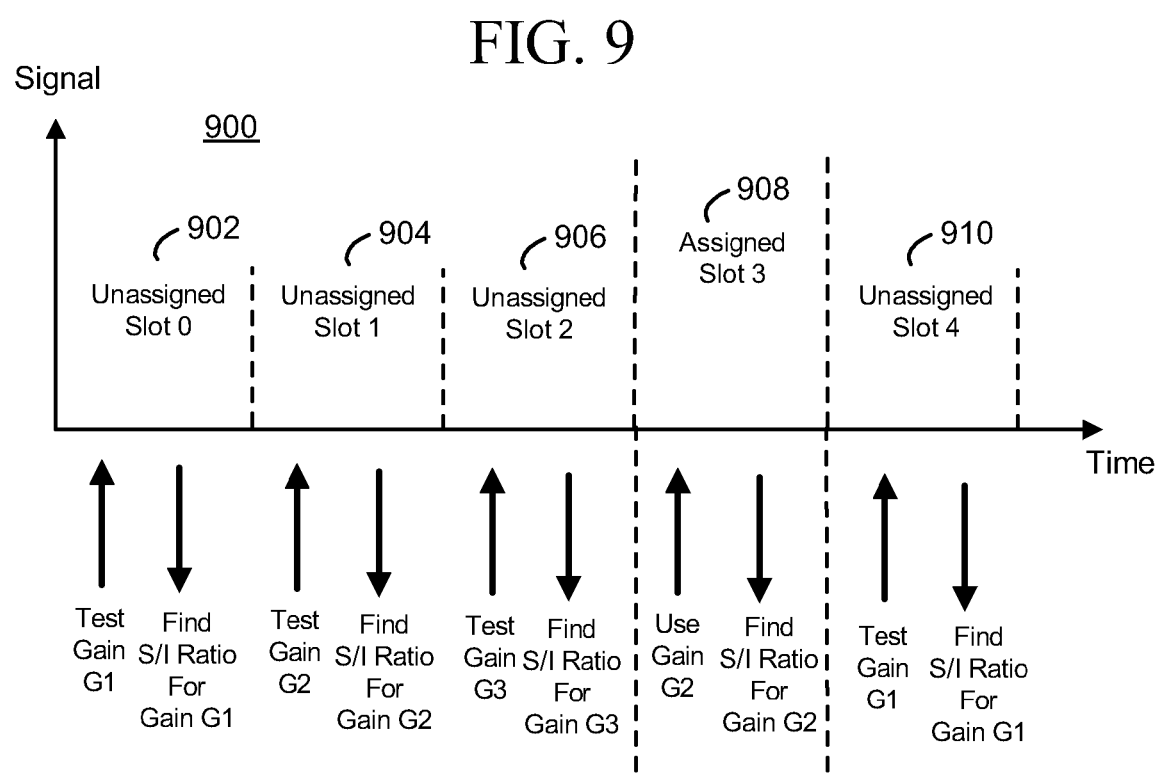
FIG. 9 is a timing diagram for testing particular gain values for S/I ratios during unassigned slots of the mobile station so that a gain value for an optimal S/I ratio may be set during assigned slots of the mobile station.

Another technique involves the mobile station utilizing test gain values during receive slots which are not assigned to the mobile station. FIG. 9 is a timing diagram 900 for testing particular gain values for S/I ratios during unassigned slots of the mobile station so that a gain value for an optimal S/I ratio may be set during assigned slots of the mobile station. As depicted in FIG. 9, the mobile station has an assigned slot 908 within which information is received. Preferably, it is during this assigned slot 908 that the optimal gain corresponding to the optimal or maximum S/I ratio is set by the gain control mechanism. In the figure, it is shown that gain G2 is utilized as the optimal gain value. Thus, assigned slot 908 may be the time during which a normal receiving mode is initiated. During slots that are not assigned to mobile station, such as unassigned slots 902, 904, 906, and 910 of FIG. 9, the gain control mechanism operates to select test gain values to determine corresponding S/I ratio values as described earlier above. In the figure, it is shown that test gain values G1, G2, and G3 are tested in unassigned slots 902, 904, 906, and 910. Thus, one or more unassigned slots 902, 904, 906, and 910 may be the time during which a gain determination mode is initiated. Thus, one or more S/I ratio values may be produced during an unassigned slot of the wireless receiver but, during a subsequent assigned slot of the wireless receiver, the gain associated with a maximum S/I ratio produced over a time period which includes the unassigned slot is selected and utilized. Note that the gain determination mode operation during unassigned slots need not be conducted for each and every consecutive unassigned slot as shown in FIG. 9, but rather may be performed for only some the unassigned slots (e.g. at slot 902, test G1, at slot 910, test G2, etc.).

Advantageously, the techniques of the present application provide the desirable characteristics of sensing both in-band and out-of-band contents with the relatively lower cost and higher accuracy inherent with today's signal processing. As described herein, one illustrative method of reducing signal interference in a wireless receiver includes receiving a radio frequency (RF) signal; amplifying the received RF signal with a gain G; producing a baseband signal from the amplified RF signal; producing a signal-to-interference (S/I) ratio from the baseband signal; and adjusting the gain G based on the S/I ratio. Preferably, the gain G is varied over a time period to produce a plurality of S/I ratios, so that the gain G corresponding a maximum S/I ratio produced over the time period can be selected for optimal performance. With this technique, higher accuracy is provided as intermodulation distortion is accounted for in the S/I ratio. The S/I ratio calculations and the gain adjustments are performed digitally by one or more processors such as a digital signal processor (DSP).

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method of processing signals in a wireless receiver, comprising:

for each one of a plurality of test gain values utilized for an amplifier of the wireless receiver during a gain determination mode of operation, repeating the following acts during one or more unassigned receive time slots which are not assigned to the wireless receiver for communications:

receiving a radio frequency (RF) signal during one of the unassigned receive time slots;

amplifying the received RF signal with a gain G;

producing a baseband signal from the amplified RF signal;

producing a signal-to-interference (S/I) ratio from the baseband signal;

selecting a gain G corresponding to a maximum S/I ratio that is produced during the gain determination mode of operation;

setting and maintaining the amplifier of the wireless receiver with the selected gain G corresponding to the maximum S/I ratio during one or more assigned received time slots assigned to the wireless receiver for communications; and while the amplifier is maintained with the selected gain G during the one or more assigned received slots, operating the wireless receiver in a normal receiving mode of operation to receive information.

2. The method of claim 1, wherein the act of producing the S/I ratio from the baseband signal is performed by a digital signal processor (DSP).

3. The method of claim 1, wherein the S/I ratio comprises a signal-to-noise (S/N) ratio.

4. The method of claim 1, wherein the S/I ratio includes intermodulation distortion.

5. The method of claim 1, wherein the one or more unassigned receive time slots comprises a plurality of consecutive time slots.

6. The method of claim 1, further comprising:
regularly repeating the above acts during operation of the wireless receiver.

7. The method of claim 1, wherein the act of producing the S/I ratio comprises:
determining a baseband signal power based on the baseband signal;
correlating the baseband signal with a predetermined correlation signal to produce a detected baseband signal;
determining a detected baseband signal power based on the detected baseband signal; and
dividing the detected baseband signal power by the baseband signal power to produce the S/I ratio.

8. A mobile station, comprising:
one or more processors;
a receiver which is adapted to receive radio frequency (RF) signals through an antenna;
an amplifier of the receiver which is adapted to amplify the RF signals;
the receiver being further adapted to produce baseband signals from the amplified RF signals;
the one or more processors being adapted to set, during a gain determination mode of operation, the amplifier with a plurality of test gain values over one or more unassigned receive time slots which are not assigned to the receiver for communications;
the one or more processors being adapted to produce, for each one of the plurality of test gain values utilized during the gain determination mode of operation, a signal-to-interference (S/I) ratio from the baseband signals;
the one or more processors being further adapted to select a gain G corresponding to a maximum S/I ratio that is produced during the gain determination mode of operation;
the one or more processors being further adapted to set and maintain the amplifier with the selected gain G corresponding to the maximum S/I ratio during one or more assigned received time slots assigned to the wireless receiver for communications; and
the one or more processors being further adapted to operate the wireless receiver in a normal receiving mode of operation to receive information while the amplifier is maintained with the selected gain G during the one or more assigned received slots.

9. The mobile station of claim 8, wherein the one or more baseband signal processors comprise a digital signal processor (DSP).

10. The mobile station of claim 8, wherein the S/I ratio comprises a signal-to-noise (S/N) ratio.

11. The mobile station of claim 8, wherein the S/I ratio includes intermodulation distortion.

12. The mobile station of claim 8, wherein the amplifier comprises a low noise amplifier (LNA).

13. The mobile station of claim 8, wherein the one or more unassigned receive time slots comprises a plurality of consecutive time slots.

14. The mobile station of claim 8, which is adapted to regularly repeat the above acts during its operation.

15. The mobile station of claim 8, wherein the one or more processors are further adapted to produce the S/I ratio by:
determining a baseband signal power based on the baseband signal;
correlating the baseband signal with a predetermined correlation signal to produce a detected baseband signal;
determining a detected baseband signal power based on the detected baseband signal; and
dividing the detected baseband signal power by the baseband signal power to produce the S/I ratio.

16. A communication system, comprising:
one or more base stations of a wireless communication network;
one or more mobile stations which are adapted for communications with the one or more base stations of the wireless communication network;
each mobile station being adapted to:
receive radio frequency (RF) signals from the one or more base stations;
amplify the RF signals;
produce baseband signals from the amplified RF signals;
set, during a gain determination mode of operation, a receiver amplifier gain with a plurality of test gain values over one or more unassigned receive time slots which are not assigned to the mobile station for communications;
produce, for each one of the plurality of test gain values utilized during the gain determination mode of operation, a signal-to-interference (S/I) ratio from the baseband signals;
select a gain G corresponding to a maximum S/I ratio that is produced during the gain determination mode of operation;
set and maintain the receiver amplifier gain as the selected gain G corresponding to the maximum S/I ratio during one or more assigned received time slots assigned to the mobile station for communications; and
operate in a normal receiving mode of operation to receive information while the receiver amplifier gain is maintained as the selected gain G during the one or more assigned received slots.

17. The communication system of claim 16, wherein the S/I ratio includes intermodulation distortion.

18. The communication system of claim 16, wherein the one or more unassigned receive time slots comprises a plurality of consecutive time slots of the base station.

19. The communication system of claim 16, wherein each mobile station is further adapted to regularly repeat the above acts during its operation.

20. The communication system of claim 16, wherein the S/I ratio comprises a signal-to-noise (S/N) ratio.

* * * * *